United States Patent [19]

Altenpohl et al.

[11] 4,187,945
[45] Feb. 12, 1980

[54] PLURAL PATH WEIGHT SORTING SYSTEM

[75] Inventors: William F. Altenpohl; Paul J. Altenpohl, both of High Point, N.C.

[73] Assignee: W. F. Altenpohl, Inc., High Point, N.C.

[21] Appl. No.: 920,255

[22] Filed: Jun. 29, 1978

[51] Int. Cl.² ............................................... B07C 5/22
[52] U.S. Cl. .................................. 209/592; 209/912; 198/680; 209/698
[58] Field of Search ............... 209/592, 593, 594, 595, 209/645, 649, 698, 903, 912; 198/401, 680

[56] References Cited

U.S. PATENT DOCUMENTS

| | | | |
|---|---|---|---|
| 3,511,370 | 5/1970 | Taylor | 209/592 |
| 3,622,000 | 11/1971 | McClenny | 209/594 |
| 3,642,130 | 2/1972 | Altenpohl | 209/592 |
| 3,680,693 | 8/1972 | Altenpohl et al. | 209/592 X |
| 3,944,078 | 3/1976 | Altenpohl | 209/592 X |
| 4,024,053 | 5/1977 | Drew et al. | 209/593 |

*Primary Examiner*—Joseph J. Rolla
*Attorney, Agent, or Firm*—Clarence A. O'Brien; Harvey B. Jacobson

[57] ABSTRACT

The loads suspended from poultry carriers are weighed at a monitoring station as the carriers travel along a fixed track. The carriers loaded above a predetermined amount are transferred to a lower level by retraction of a section of the track downstream of the weighing platform. A selectively retractable ejector bar engages a latch arm projecting from each carrier, during descent to the lower level for release of the load suspended on the carrier. Descent of the carrier to the lower level is retarded by a pivoted ramp which also produces a signal to register transfer of a carrier from the fixed track to the lower level.

21 Claims, 7 Drawing Figures

4,187,945

PLURAL PATH WEIGHT SORTING SYSTEM

BACKGROUND OF THE INVENTION

This invention relates in general to weight sorting systems for poultry or the like and in particular to improvements in equipment and apparatus for the sorting of poultry suspended by elongated carriers from an overhead conveyor.

Poultry weight sorting systems such as disclosed in U.S. Pat. No. 3,132,373 include a fixed horizontal track along which elongated carriers are supported by rollers for travel through a weighing or monitoring station, the carriers being otherwise suspended directly from an overhead conveyor during travel to and from the weighing station. A weighing platform positioned within a gap formed in the fixed track at the monitoring station is connected to a weighing scale for measuring poultry suspended from the carrier as it loads the platform during travel across the gap. Loads above a preset value are accordingly detected by the weighing scale to produce a signal which is operative in some sorting systems to effect release of the load from the carrier by operation of an ejection mechanism engaging a latch release arm projecting from the carrier. According to the aforementioned patent, the ejection mechanism includes a power operated plunger that is projected into the path of the latch release arm as the carrier is conveyed along the fixed track. According to U.S. Pat. Nos. 3,291,303 and 3,680,693, two weighing platforms are provided at which signals are produced to control operation of a single ejection mechanism for releasing loads between upper and lower weight limits respectively established at the two weighing platforms. According to U.S. Pat. No. 3,944,078, a plurality of weighing stations are provided at which loads within different weight ranges are released, and wherein signals produced at each station are counted to equalize the distribution of poultry dropped or released at each of the weighing stations. In all of the systems disclosed in the foregoing prior patents, poultry is either released from or continues to travel with its carrier while supported on the fixed track to which it is elevated as the carrier approaches the weighing station and each carrier, whether unloaded or not, travels along the same path through each weighing station. Further, operation of the system, regardless of the program to which it is limited, is controlled by signals produced in response to detection of loads above preset limits at each of the weighing stations, movement of the carriers past certain locations and operation of the ejection mechanisms.

It is an important object of the present invention to provide an improvement to the foregoing weight monitoring and sorting systems wherein operational programming and controls may be simplified as well as to provide equipment having greater flexibility with respect to its adaptation to different system installations and programs.

A further object is to provide a weight sorting system in which loads are released from the conveyor carriers by a passive type of ejector mechanism that does not involve powered operation.

SUMMARY OF THE INVENTION

In accordance with the present invention, a typical weight monitoring station associated with an overhead conveyor from which poultry carriers of the type disclosed in U.S. Pat. No. 3,132,373 are suspended, has a gap formed in the fixed track downstream of the weighing platform at which the weighing operation is performed. A retractable track section is positioned in the gap to control a path changing operation wherein the carrier is dropped from the fixed track and descends to a lower level for continued travel along the conveyor path. A pivoted arrestor ramp underlying the gap retards descent of the carrier during transfer to its lower level following retraction of the retractable track section. Such transfer occurs in response to signals produced by the weighing scale connected to the scale platform at the weighing station.

Ejection of the load from the carrier occurs in response to descent of the carrier when transferring to the lower level path by virtue of the latch release arm on the carrier engaging a fixed or passive ejector bar. The ejector bar may be retracted to disable the ejection operation under manual control or in response to logic commands produced in accordance with a preset program.

Pivotal disclacement of the arrestor ramp against a counterweight bias during the path changing operation aforementioned, produces a signal which may operate a digital counter and/or reset the power operator through which retraction of the retractable track section is effected.

To reduce impacts on the weighing platforms and retractable track sections, due to lateral swing of the carriers, the gaps, the platforms and track sections extend rearwardly at an acute angle to the direction of carrier travel. This configuration also reduces the likelihood of carrier entanglement.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENT

Figure 1:
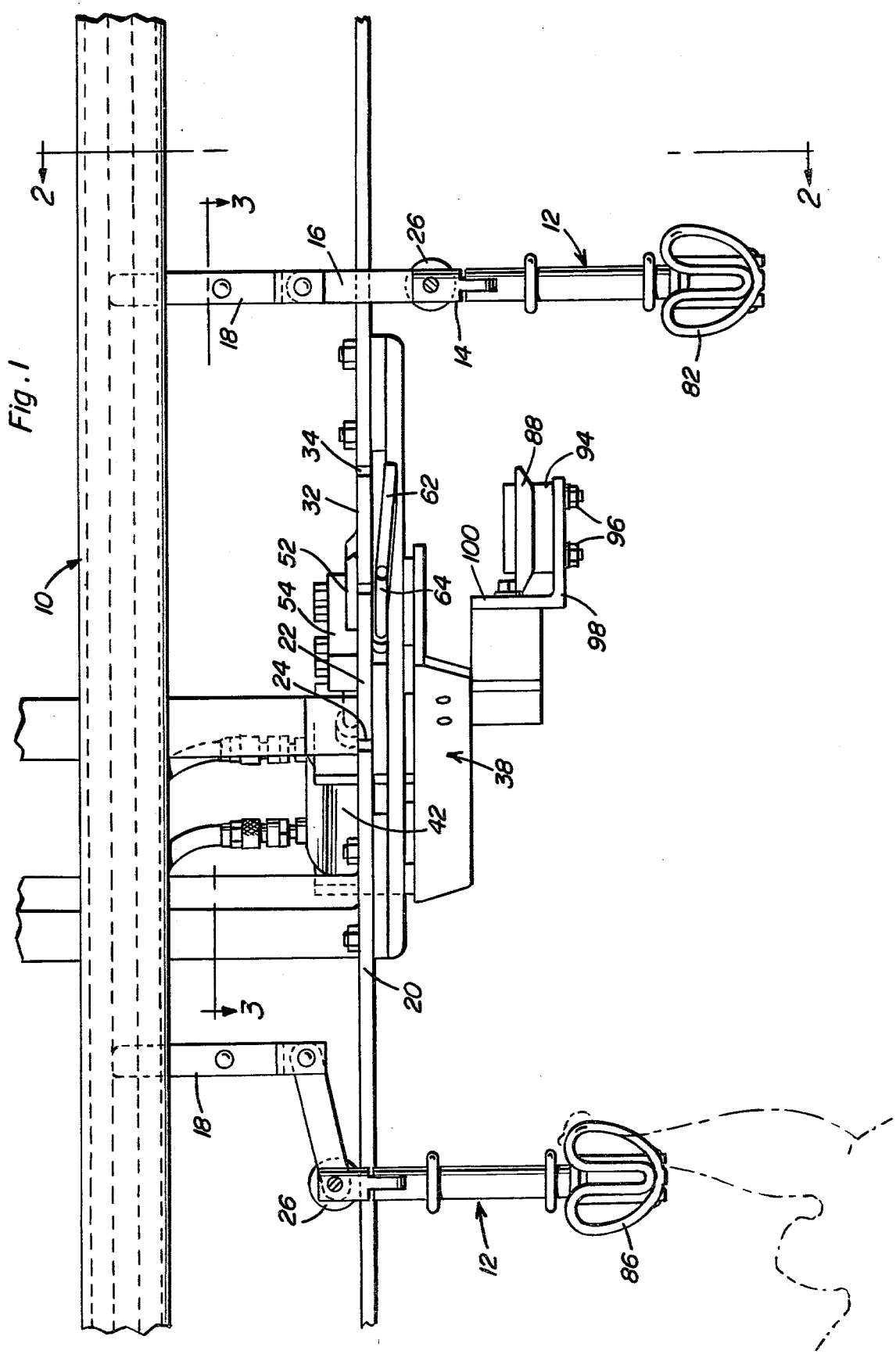
FIG. 1 is a side section view through a portion of a poultry weight sorting system constructed in accordance with the present invention.
Figure 2:
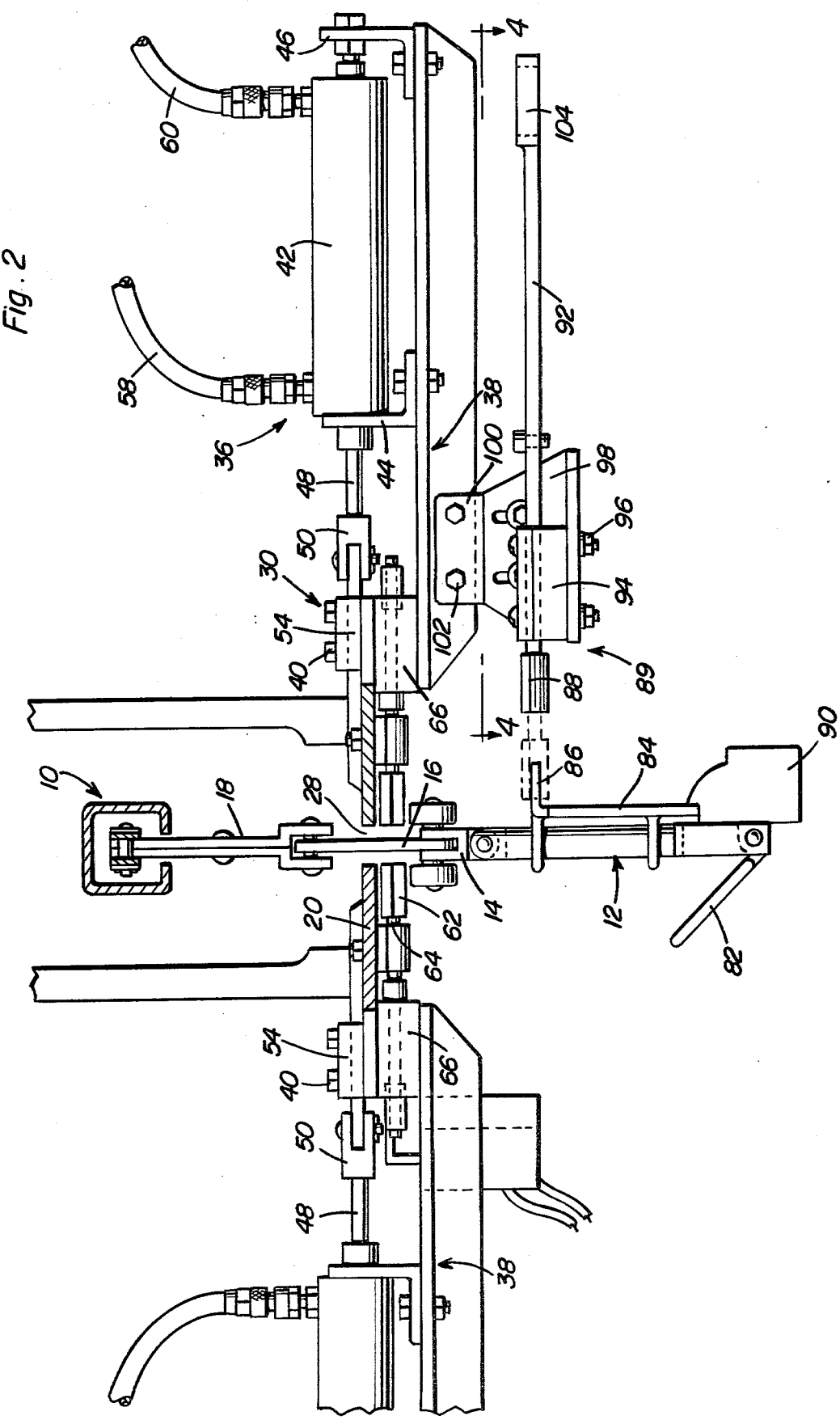
FIG. 2 is a transverse section view taken substantially through a plane indicated by section line 2—2 in FIG. 1.
Figure 3:
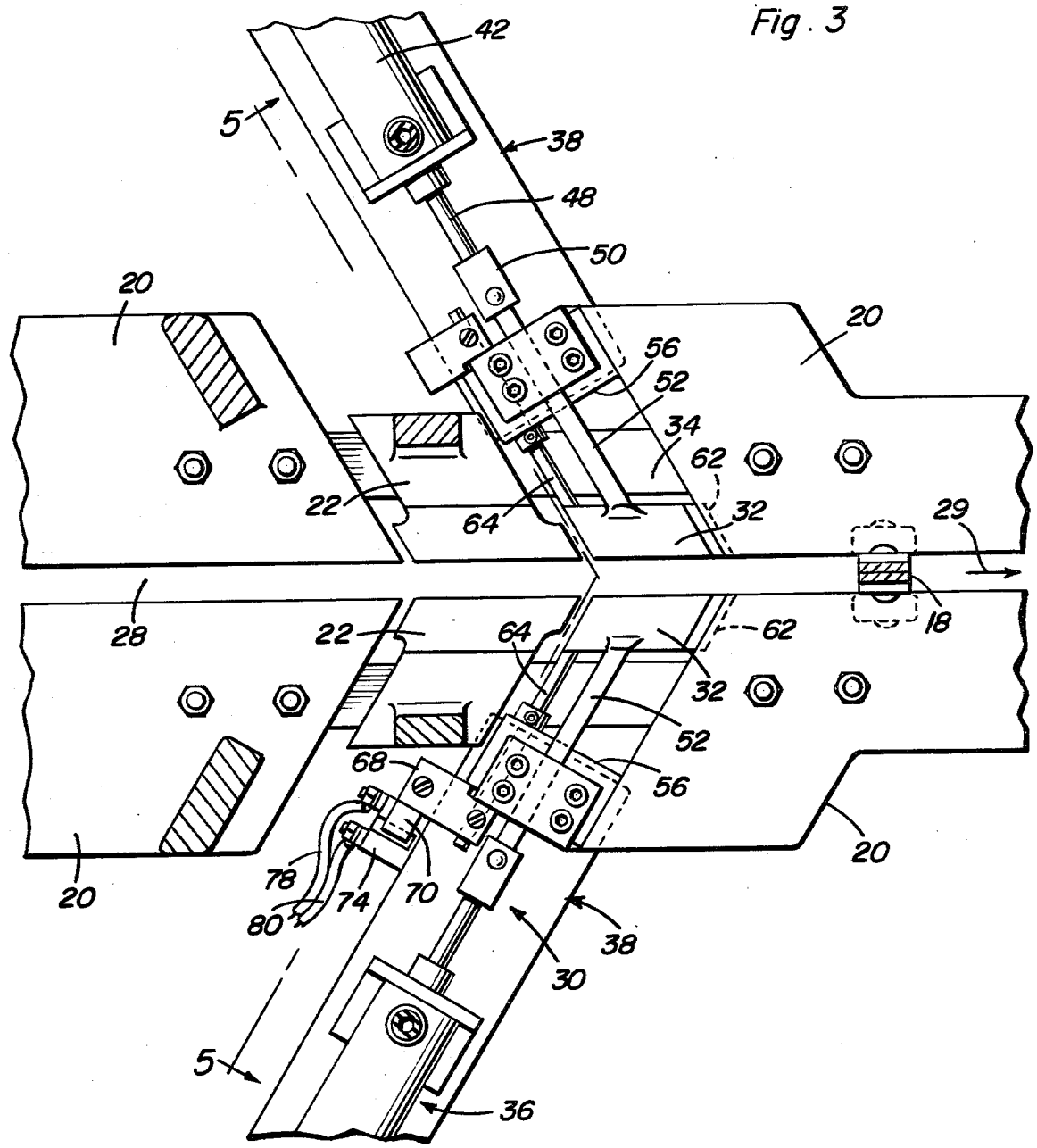
FIG. 3 is an enlarged top section view taken substantially through a plane indicated by section line 3—3 in FIG. 1.
Figure 4:
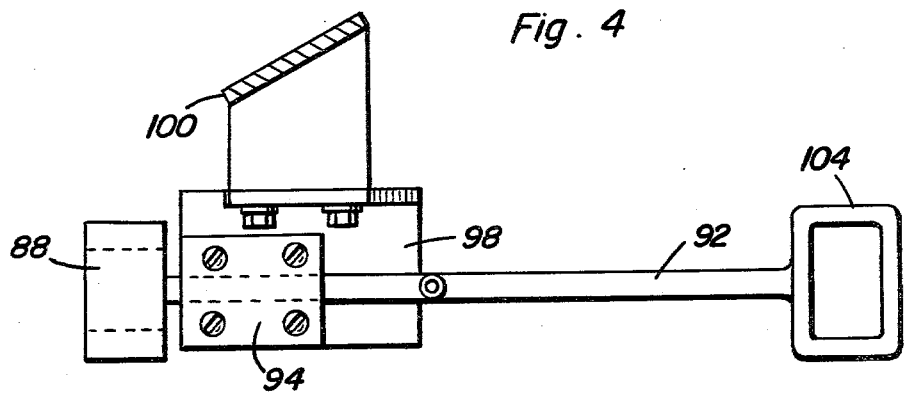
FIG. 4 is a partial section view taken through a plane indicated by section line 4—4 in FIG. 2.

Referring now to the drawings in detail, FIGS. 1, 2 and 3 illustrate a single monitoring station underlying an overhead conveyor 10 establishing a path of travel for birds or loads suspended from a plurality of carriers 12 moving in spaced relation to each other through the weight monitoring station. The carriers 12 suspended by links 14 and 16 and pulling arms 18 from the conveyor, are elevated to an upper level for travel along a first path through the monitoring station established by a fixed track 20 supported in spaced relation below conveyor 10. A vertically movable weighing platform 22 connected to a weighing scale device as shown in U.S. Pat. No. 3,680,693 is positioned within a gap 24 formed in the track to measure the load of each carrier as its rollers 26 move along the track traversing the gap 24. The paths of travel for the carriers are therefore determined by the locii of the rotational axes extending through the rollers 26.

Carriers loaded by birds above a preset weight will be detected by vertical movement of the weighing platform 22 to produce a signal for controlling subsequent operaion of the system including either continued travel of the carrier along the path established by the fixed track 20 or dropping of the carrier from the track for continued travel along a second lower level corresponding to the same path of the carriers approaching and departing from the monitoring station. In the embodiment illustrated, the gap 24 formed in the fixed track on opposite lateral sides of the space 28 through which the carriers pass, and the platform 22 positioned in the gap, extend at a rearward angle to the path of travel as more clearly seen in FIG. 3. As a result of the foregoing angular relationship of the platform 22 and gap 24 to the path of travel, hang-up of carriers on the track at gap-formed corners because of excessive lateral swing, is avoided in the direction of travel shown by arrow 29.

In accordance with the present invention, each monitoring station has associated therewith a path changer assembly generally referred to by reference numeral 30 in FIGS. 1, 2 and 3. The path changer assembly is constituted by a pair of retractable track sections 32 positioned within either a gap separate from gap 24 or enlargements of the gaps 24 or recesses 34 as shown formed in the fixed track downstream of the weighing platforms 22 in the direction of travel. The track sections 32 and gaps 34 extend at the same rearward angle to the direction of travel as the platform 22 and for the same reason hereinbefore indicated. As long as the track sections 32 remain in place as shown in FIG. 3, the carriers supported by the rollers 26 continue to travel along the entire length of the fixed track 20 at the monitoring station. However, the track sections 32 may be retracted laterally from the gaps 34 by power operators 36 supported on platforms 38 extending laterally from the track 20 and secured thereto by fasteners 40. Each power operator 36 includes a fluid cylinder device 42 anchored to the platform 38 by brackets 44 and 46 and having a piston rod 48 extending therefrom. Each piston rod 48 is connected by a coupling 50 to the end of an actuator plunger 52 to which the track section 32 is connected. The actuator plunger 52 extends through a guide slot formed in a guide block 54 secured by fasteners 40 to a portion 56 of the fixed track defining a laterally outward limit for the gap or recess 34. A pair of fluid conduits 58 and 60 are coupled to the cylinder device 42 for respectively causing retraction of the track section 32 or reset thereof, when pressurized. Both track sections 32 are retracted from alignment with the confronting edges of the track 20 defining space 28 to cause dropping of the carrier as its rollers 26 move over the space otherwise occupied by the track section 32. The carrier will then continue to travel with its rollers below the track 20.

As a carrier is dropped from the track 20 by retraction of the track sections 32, the rollers 26 engage arrestor ramps 62 which pivot downwardly under the load in the direction of travel to retard descrnt of the carrier to the lower level. The ramp 62 is therefore biased to an upper position underlying the track section 32 as shown in FIG. 1 from which it is downwardly displaced to a path bridging position. A pivot shaft 64 is connected to the ramp and extends laterally therefrom through a bearing block 66 spacing the support platform 38 below the track 20. A counterweight 68 is connected to the end of the pivot shaft opposite ramp 62 for gravitationally biasing the ramp to its upper position.

Figure 5:
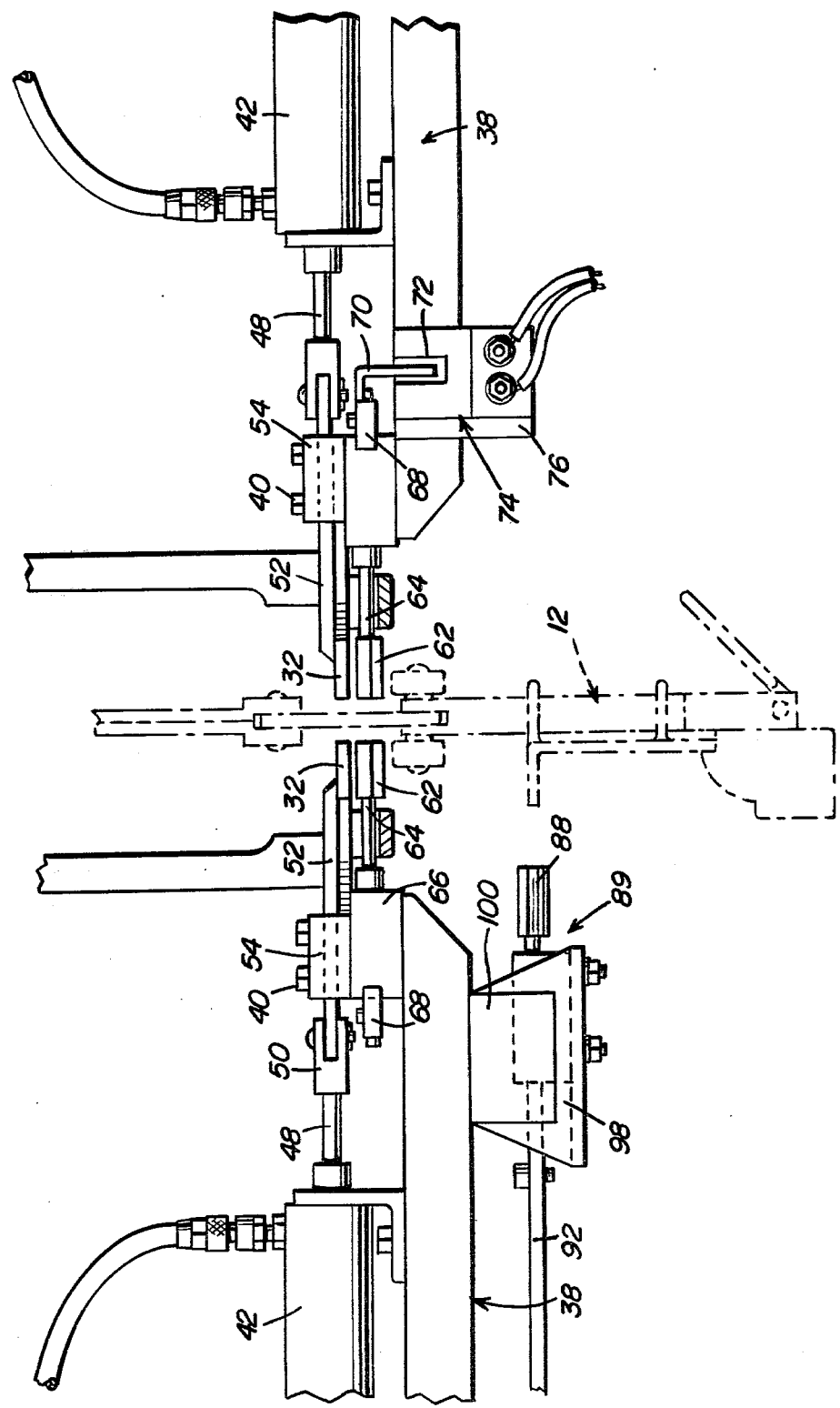
FIG. 5 is an enlarged partial section view taken through a plane indicated by section line 5—5 in FIG. 3.

In addition to retarding descent of a carrier 12, at least one of the pivoted ramps 62 is operative through its counterweight 68 to produce a signal pulse reflecting actual transfer of a carrier to the lower level at the monitoring station following the weight sensing operation performed at platform 22. Toward that end, one of the counterweights 68, as shown in FIG. 5, has a signal arm 70 secured thereto, normally positioned within the air gap 72 of a fluidic sensor module 74 mounted on bracket 76 depending from support platform 38. Fluidic signal lines 78 and 80 are coupled to the sensor module 74, as shown in FIG. 3, for registering the carrier path changing event detected by the ramps 62. The signal pulses produced may be used to drive a counter for controlling or equalizing distribution of loads ejected at a plurality of stations, as disclosed in U.S. Pat. No. 3,944,078 aforementioned.

The descent of a carrier 12 during the aforementioned path changing event may also be operative to effect release of any load suspended from hook 82 pivoted on the lower end of the carrier and held in its upwardly inclined position by the latch bar 84 from which the latch release arm 86 extends. A latch release plate 88 forming part of a passive ejector mechanism 89, is positioned, as shown by dotted line in FIG. 2, in the downward path of movement of arm 86 adjacent its lower end of travel so as to upwardly displace the latch bar 84 relative to its carrier 12. Any load suspended from hook 82 will then cause the hook to pivot downwardly against the bias of its counterweight 90 and slide off and thereby be ejected from the conveyor. The release plate 88 is connected to a bar 92 slidably mounted by a slide block 94 secured by fasteners 96 to a bracket 98 adjustably positioned on a hanger plate 100 depending from the support platform 38 to which it is secured by fasteners 102. A handle 104 is connected to the end of bar 92 for manual retraction of the release plate 88 to the position shown by solid line in FIG. 2 in order to disable the ejector mechanism. Retraction of the plate 88 may also be effected by a powered operator under commands derived from a programmed control system.

Figure 6:
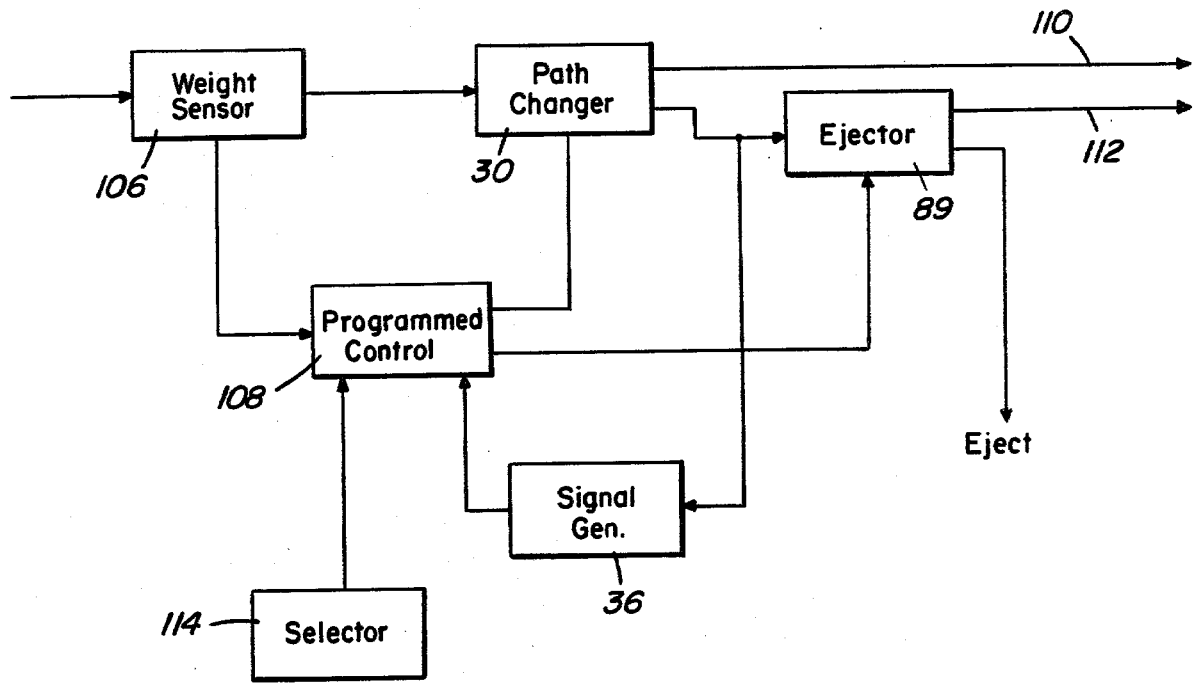
FIG. 6 is a schematic block diagram showing a general system installation for the present invention.

The single weight sensing station depicted in FIGS. 1–5 may form part of a larger system, a portion of which is schematically depicted in FIG. 6 wherein a single weight sensing scale device 106, with which platform 22 is associated, produces a signal fed to the path changer 30 through a programmed control 108 for changing the path of travel of the carriers from the upper level path 110 to the lower level path 112 as hereinbefore described. The control 108 may be programmed, for example, to prevent operation of the path changer 30 after a predetermined number of path transfers have been made. The control 108 will accordingly count the signal pulses received from a signal generator, such as the fluidic sensor module 36 hereinbefore described. The count may be preset by a selector 114. Alternatively, the programmed control 108 may disable the ejector mechanism 89 by commands, as hereinbefore indicated, after a certain count is attained. In this fashion, loads may be released from the carriers at different locations along path 112.

Figure 7:
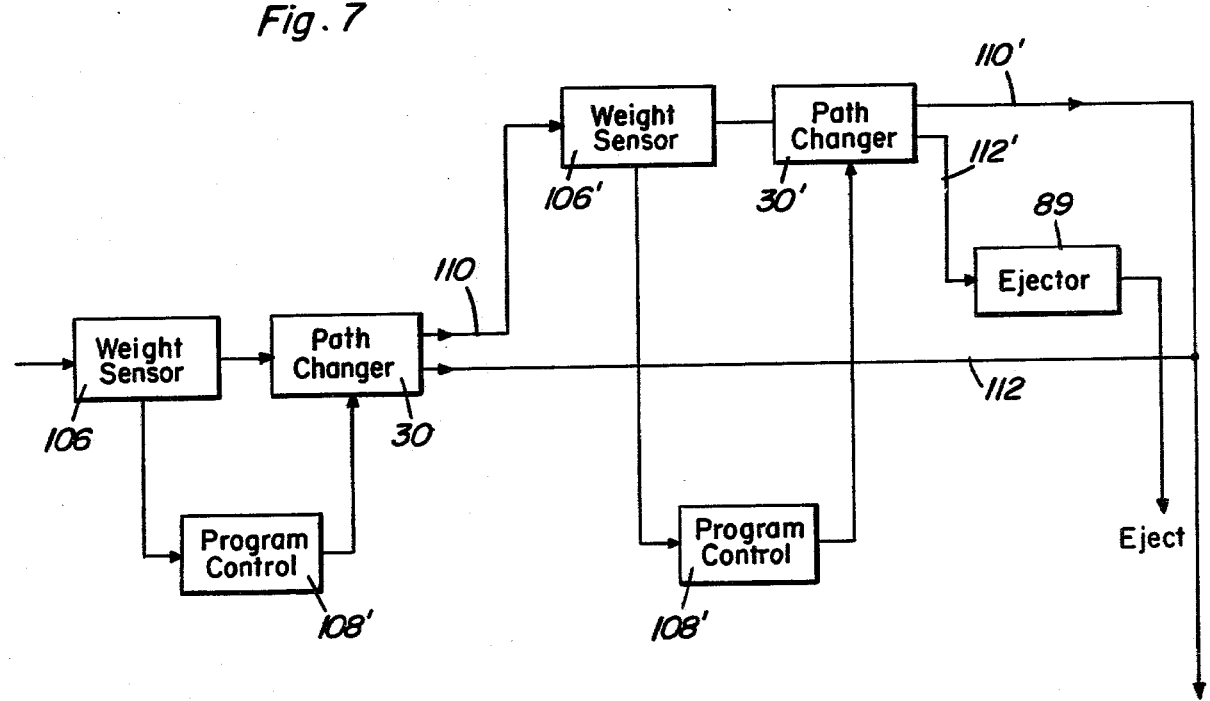
FIG. 7 is a schematic block diagram showing one particular type of system installation for the present invention.

The enhanced adaptability of a monitoring station constructed in accordance with the present invention to different system programs is further demonstrated in FIG. 7, which corresponds to the type of weight sorting system disclosed in U.S. Pat. Nos. 3,291,303 and 3,680,693 aforementioned. In FIG. 7, the upper weight limit of a weight range is established by weight sensor 106. Any loads above the upper limit are transferred to the lower path 112 by the path changer 30 while the other loads within the selected weight range continue to travel along the upper path 110. No loads are ejected during this first weighing operation so that the ejector is either eliminated or maintained disabled by the control 108. The overweight loads moving along path 112 will by-pass the second weighing platform or weighing operation from which underweight loads depart along path 110'. By this second weighing operation, the lower weight limit is established through a second weight sensor 106' which is operative through control 108' to feed operating commands to a second path changer 30' causing transfer of loads above the lower limit to the lower path 112' from which the loads are ejected by an ejector 89. Thus, only loads within a preselected weight range are removed from the conveyor while overweight and underweight loads continue to travel on the conveyors toward other stations.

The path changing operation hereinbefore described enables use of a passive type of ejector mechanism which may be disabled manually without disturbing operation of the control system that heretofore required generation of signal commands to operate the ejector mechanism. Further, the path changing operation produces an event registering signal independently of the weighing and ejection operations to further simplify the control circuitry of any associated control system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a conveyor moving a plurality of carriers through at least one monitoring station along a first path of travel, a weight sorting system including sensing means for detecting those of the carriers at said station loaded above a predetermined value, path changing means rendered operative for establishing a second path of travel along which the loaded carriers may be moved by the conveyor at said station, and control means responsive to said detection of the loaded carriers by the sensing means for rendering the path changing means operative to transfer movement of the loaded carriers from the first path to the second path of travel.

2. The combination of claim 1 including a fixed track supporting the carriers during travel along said first path vertically spaced above the second path of travel.

3. The combination of claim 2 wherein said carriers include hooks from which objects are releasably suspended, and rollers supported on said fixed track during travel along the first path, said paths of travel being defined by movement of the axes extending through the rollers.

4. The combination of claim 3 wherein said path changing means includes a gap formed in the fixed track downstream of the sensing means along said first path of travel, a retractable track section positioned in said gap, and arrestor means for retarding descent of the carriers through said gap in response to retraction of the retractable track section by the control means, said carriers being suspended from the conveyor with the rollers below the fixed track during travel along said second path.

5. The combination of claim 4 including signal generating means responsive to displacement of the arrestor means by the carriers during transfer to the second path for generating signals registering detection of the loaded carriers by the sensing means.

6. The combination of claim 5 including latch means mounted on each of the carriers for holding the objects suspended therefrom, and passive ejection means engageable by the latch means in response to said transfer of the loaded carriers from the first to the second path of travel for releasing the objects from the loaded carriers.

7. The combination of claim 6 including means for selectively retracting the ejection means to disable operation thereof.

8. The combination of claim 2 wherein said path changing means includes a gap formed in the fixed track downstream of the sensing means along said first path of travel, a retractable track section positioned in said gap, and arrestor means for retarding descent of the carriers through said gap in response to retraction of the retractable track section by the control means.

9. The combination of claim 8 including signal generating means responsive to displacement of the arrestor means by the carriers during transfer to the second path for generating signals registering detection of the loaded carriers by the sensing means.

10. The combination of claim 8 wherein said arrestor means includes a pivotally mounted ramp, and means biasing the ramp from a path bridging position to a position underlying the gap in the fixed track.

11. The combination of claim 1 including latch means mounted on each of the carriers for holding an object suspended therefrom, and passive ejection means engageable by the latch means in response to said transfer of the loaded carriers from the first to the second path of travel for releasing the object from the loaded carriers.

12. The combination of claim 11 including means for selectively retracting the ejection means to disable operation thereof.

13. In combination with a conveyor moving a plurality of carriers through at least one monitoring station along a first path of travel, an operational control assembly comprising sensing means for detecting selected ones of the carriers at said station, path changing means rendered operative for establishing a second path of travel along which the selected carriers are moved by the conveyor from said station, means responsive to transfer of the selected carriers from the first path to the second path of travel for generating signals registering detection of the selected carriers by the sensing means, and control means connected to the sensing means and the signal generating means for rendering the path changing means operative to effect said transfers of the selected carriers between the paths of travel.

14. The combination of claim 13 including passive means connected to the control means and engageable with the selected carriers in response to transfer thereof to the second path for releasing loads therefrom.

15. The combination of claim 14 including a fixed track supporting the carriers during travel along said first path vertically spaced above the second path of travel, said path changing means including a gap formed in the fixed track downstream of the sensing means along said first path of travel, a retractable track section positioned in said gap, and arrestor means for retarding descent of the carriers through said gap in response to retraction of the retractable track section by the control means.

16. The combination of claim 13 including a fixed track supporting the carriers during travel along said first path vertically spaced above the second path of travel, said path changing means including a gap formed in the fixed track downstream of the sensing means along said first path of travel, a retractable track section positioned in said gap, and arrestor means for retarding descent of the carriers through said gap in response to retraction of the retractable track section by the control means.

17. In combination with a conveyor moving a plurality of carriers past at least two monitoring locations along a first path of travel, an operational control assembly associated with each of said locations, comprising sensing means for detecting selected ones of the carriers at said station, path changing means rendered operative for establishing a second path of travel along which the selected carriers are moved by the conveyor from said station, means responsive to transfer of the selected carriers from the first path to the second path of travel for generating signals registering detection of the selected carriers by the sensing means, control means connected to the sensing means and the signal generating means for rendering the path changing means operative to effect said transfers of the selected carriers between the paths of travel and passive means connected to the control means associated with one of the operational control assemblies for engaging the selected carriers during transfer to the second path adjacent one of the monitoring locations.

18. The combination of claim 17 wherein the sensing means measure the loads carried by the carriers, whereby the loads within a preset weight range are released by the carriers from the second path at said one of the monitoring locations.

19. In combination with a conveyor moving a plurality of carriers in one direction through at least one monitoring station along a path of travel, a fixed track structure disposed substantially parallel to the conveyor comprising a pair of laterally spaced support surface portions between which said carriers are movable along said path of travel, said track structure having at least one gap formed in one of the support surface portions, and movable track means occupying said gap for displacement from a position substantially flush with said one of the support surface portions, said gap and movable track means extending rearwardly at an acute angle to said path of travel relative to said one direction.

20. The combination of claim 19 wherein said movable track means includes a weighing platform at the monitoring station.

21. The combination of claim 20 wherein said movable track means further includes a pivoted track section located in another gap formed in the track structure downstream of the weighing platform in the direction of travel.

* * * * *